Oct. 3, 1944.                E. W. FULLER                 2,359,553
                      WINDSHIELD WIPER MECHANISM
                         Filed Jan. 6, 1942

INVENTOR.
Ernest W. Fuller
BY
Duell, Kane and Smoot
ATTORNEYS

Patented Oct. 3, 1944

2,359,553

UNITED STATES PATENT OFFICE 2,359,553

WINDSHIELD WIPER MECHANISM

Ernest Willie Fuller, Shaker Heights, Ohio, assignor to The Acrotorque Company, Cleveland, Ohio, a corporation of Connecticut Application January 6, 1942, Serial No. 425,752

2 Claims. (Cl. 15—253)

This invention relates to a structurally and functionally improved wiper mechanism and in its more specific aspects aims to provide a unit of this character which will be of primary utility when applied to an airplane where unusual and demanding conditions of operation exist.

It is an object of the invention to furnish a mechanism of this type and by means of which a windshield or other panel may be readily and efficiently cleaned under either snow, ice or rain conditions and the control of which apparatus may readily be effected by the pilot or other operator without any conscious effort being required.

With these and other objects in mind, reference is had to the attached sheet of drawings illustrating one practical embodiment of the invention, and in which.

Figure 1:
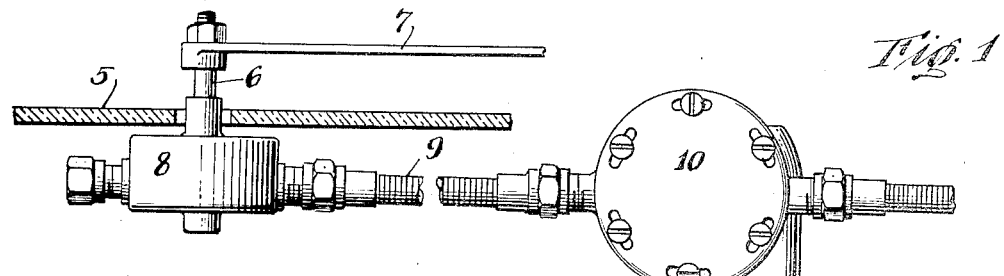
Fig. 1 is a fragmentary plan view of the apparatus.

Referring primarily to Fig. 1, the numeral 5 indicates a surface to be cleaned and beyond which a shaft 6 extends. Secured to this shaft is an arm 7 which may support a wiper blade and also a structure for the distribution of de-icing fluid (all of which has not been shown).

The shaft 6 is oscillated or otherwise suitably driven by means of mechanism disposed within the casing 8. In accordance with conventional design, such mechanism may include a rack and pinion structure. Such structure is in turn operated by a control disposed, for example, in a conduit or casing 9 which is, in turn, connected to an enclosing member 10. The structure within the latter preferably includes a mechanism, such as is disclosed in the prior United States application for Letters Patent in the name of Sacchini and Waterman for Windshield wiper mechanism, filed November 19, 1941, Serial Number 419,734. However, an alternative form of mechanism might obviously be employed.

Extending from the housing 10 is a conduit 11, within which a torque cable or other suitable element may be disposed. The latter is driven by a motor 12. The motor is, of course, suitably mounted within the cockpit or other desired portion of the airplane (in the event that the unit is associated with such a type of vehicle) and the same is true of the mechanism generally identified by the reference numerals 6 to 11 inclusive. As has been indicated, any suitable number of wiper arms may be driven by the single motor 12 and it is intended that, when the latter once begins to operate, all of these arms or their equivalents may move in synchronism.

Figure 2:
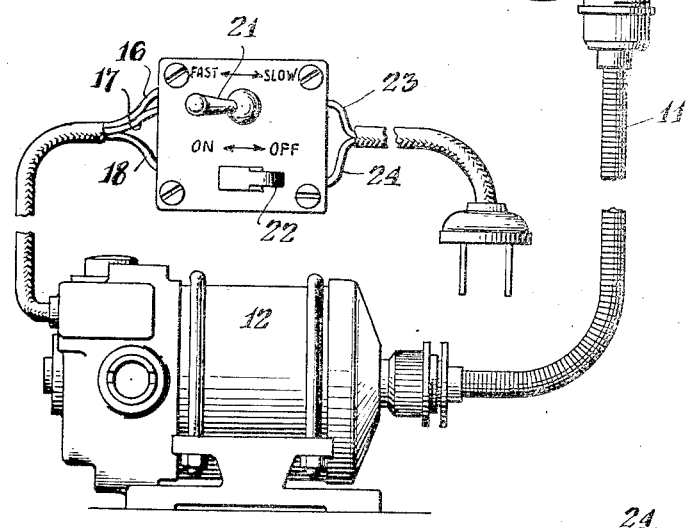
Fig. 2 is a somewhat diagrammatic representation of the wiring circuit.
Figure 2:
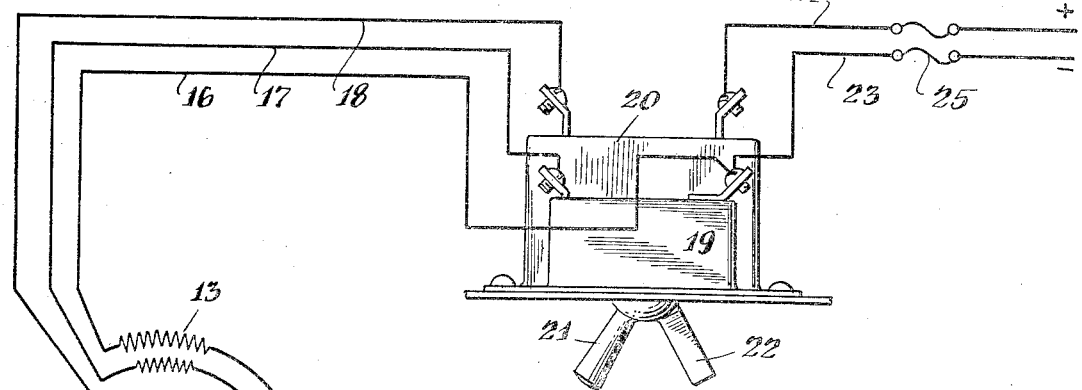
Figure 3:
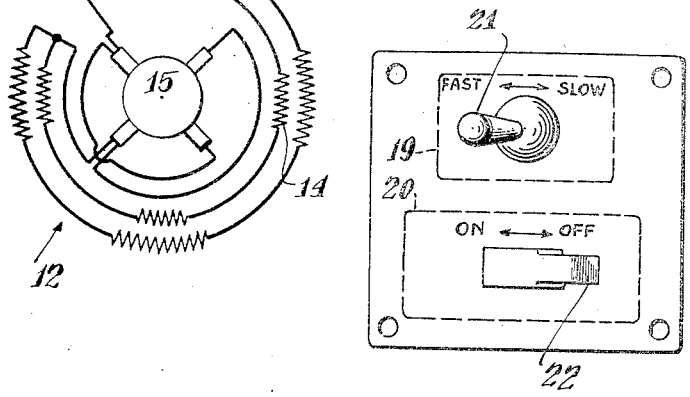
Fig. 3 is a face view of the control switch or switches which may form a part of the apparatus.

As shown especially in Fig. 2, the motor and its associated mechanism are free of electrical resistances. Rather, this motor has two field coils identified by the reference numerals 13 and 14. These coils are wound so that the armature 14 of the motor is driven in different directions according to the coil which is energized. Also one field coil serves for half speed operation while the other field coil is for full speed functioning. Under such circumstances, it will be understood that, in effect, the pilot or operator has available at least two speeds of operation. The fact that the motor may be moving in opposite directions is, of course, quite immaterial under normal operation in that, regardless of the rotation of the motor, the range traversed by the arms 7 and the manner of movement of these arms will be the same. On the other hand, with reverse movement available, an extremely desirable result may be achieved as will be hereinafter brought out.

Extending from the motor are leads 16, 17 and 18, which connect with the terminals of switches 19 and 20. These switches may be ordinary switches of the two-pole type and from which actuators 21 and 22 extend. These manual controls should, of course, be readily available to the operator or pilot. From the switch assembly leads 23 and 24 extend through to a source of current supply and fuses 25 may be interposed in these leads. Also, it is to be noted that the switch 20 is preferably of the thermal overload type so that it may achieve this additional function aside from interrupting and establishing the flow of current through lead 18.

With a motor of the type shown, and assuming that the circuit through switch 20 has been closed current will flow through lead 18 as well as one or both of the leads 16 and 17 according to the manner in which the switch assembly is connected. With both leads 16 and 18 energized, the motor will operate at half speed and, for example, in a reverse direction. With leads 16 and 17 both connected to the negative side of the power source, the motor operates in a forward direction and at full speed. Also, if the switch assembly is of a nature such that this is permissible, or if the wires are connected so that current flows only through leads 18 and 17, then a three-quarter speed forward movement on the part of the motor will occur.

Accordingly, to start the mechanism operating, all that the pilot need do is to close the switch 20. According to the setting of switch 19, the motor 12 will operate in a forward or reverse direction. Also, it will operate either at full speed or one-half speed (conceding that solely the latter form of connection is established). Under fast speed, the blade secured to the arms 7 or their equivalents will serve to clear the windshield or other panel of rain. Under a slow speed, the operation will be particularly calculated to clear ice and snow from the windshield.

It is especially to be noted, however, that the pilot, with switch 20 closed and if the blades or their equivalents are jammed by accumulations of ice on the surface to be cleaned, may, by simply shifting switch 19 back and forth, cause the mechanism to be driven first in one direction and then the other. This will be especially valuable in establishing a "rhyming" action on the part of the apparatus and such as will assure a freeing of the blade or blades and a gradual traversal of the same throughout an increasing range until the switch 19 may be left permanently in its proper position. This will, of course, be the case when a sufficient area of the windshield has been cleared to assure that the entire surface will be cleaned under continued and normal operation of the apparatus.

I claim:

1. An apparatus of the character described, including in combination a blade-mounting arm supported for pivotal movement, a rotatable and reversible motor connected thereto to swing said arm, switch means for causing said motor to optionally rotate in clockwise and counter-clockwise directions, and means whereby the rotation of said motor in a clockwise direction occurs at a speed different from that in which it rotates in a counter-clockwise direction.

2. An apparatus of the character described, including in combination a blade-mounting arm supported for reciprocating movement, a rotatable and reversible motor connected thereto to move said arm, switch means controllingly connected to the motor for causing said motor optionally to rotate in relatively reverse directions, said motor being so constructed and arranged that the rotation of the motor in one direction occurs at a speed different from that in which it rotates in the reverse direction, and a single manually operable part operatingly connected to said switch means for causing the motor to operate in both said directions and respective speeds.

ERNEST WILLIE FULLER.